UNITED STATES PATENT OFFICE.

JULIUS BUEB, OF DESSAU, GERMANY, ASSIGNOR TO THE ROESSLER & HASSLACHER CHEMICAL COMPANY, A CORPORATION OF NEW YORK.

CYANID BRIQUET AND PROCESS OF MAKING SAME.

No. 859,482.   Specification of Letters Patent.   Patented July 9, 1907.

Application filed March 19, 1907. Serial No. 363,247.

*To all whom it may concern:*

Be it known that I, JULIUS BUEB, a subject of the German Emperor, and a resident of Dessau, Germany, have invented a certain new and useful Improvement in Cyanid Briquets and Process of Making the Same, of which the following is a specification.

It is well known that the cyanids which are used for gold extracting purposes are not merchantable in their crystalline form on account of being too easily decomposed by air and humidity. For this purpose the crystals are molten. The molten material, after having been cooled, forms a hard mass like porcelain, which offers greater resistance to the influences of air and humidity, than crystals.

The process of melting is connected with comparatively large losses. It has, therefore, been desirable to replace the process of melting, by a process of compressing in order to obtain hard, air and humidity resisting cyanid briquets. In making such cyanid briquets, I have found that the same do not offer, by far, so strong a resistance against air and humidity as the molten mass.

My invention consists in increasing the stability of such cyanid briquets against humidity of air by adding small amounts of free caustic alkali to the salt so that each particle of cyanid is mixed with and inclosed by small amounts of free caustic alkali.

As the decomposition of the cyanid is principally caused by the carbonic acid and water vapors contained in the atmosphere, the caustic alkali mixed with the cyanid protects the latter against decomposition by absorbing the carbonic acid and water vapors under the formation of alkali carbonate, the affinity of carbonic acid and water vapors being by far greater for the free alkali than the cyanid. If the air, coming in contact with cyanid, reacts first with the free caustic alkali, the latter absorbs the carbonic acid and water vapors and purifies the air in such way from the agents which would affect the cyanid, so that no decomposition of the cyanid takes place.

As the amount of carbonic acid and water vapors in the air is very small, a small percentage of the caustic alkali in the cyanid, for example two per cent, is sufficient to protect the latter for a long time against decomposition.

The result set forth is not obtained by simply mixing free caustic alkali in powder form with the cyanid, but by adding free caustic alkali in solution substantially as described during the process of making cyanid crystals.

It is to advantage to evaporate the cyanid solution in caustic alkali solution whereby during the process of crystalizing the cyanid out, whether cold or hot, free caustic alkali crystallizes out at the same time. The mass so obtained after being dried is compressed to form briquets.

The product obtained is stable for transportation and storage, does not readily decompose through the action of the humidity of the air and can readily be used in the usual processes employing cyanids.

What I claim and desire to secure by Letters Patent of the United States is:—

1. An improved cyanid product which consists of particles of cyanid mixed with, and inclosed by, a layer of free caustic alkali.

2. In a process of making cyanids, the improvement which consists in separating the cyanid from its solution in the presence of free caustic alkali.

3. In a process of making cyanids, the improvement which consists in adding free caustic alkali to the cyanid solution and crystallizing the cyanid and alkali.

4. In a process of making cyanids, the improvement which consists in adding a solution of free caustic alkali to the cyanid solution, crystallizing the cyanid and alkali, drying the same and compressing it into briquets.

In witness whereof I have hereunto signed my name this first day of March 1907, in the presence of two subscribing witnesses.

JULIUS BUEB.

Witnesses:
HENRY HASPER,
WOLDEMAR HAUPT.